(12) United States Patent
Strauss et al.

(10) Patent No.: US 9,981,390 B1
(45) Date of Patent: *May 29, 2018

(54) FLAT GRIPPER ACTUATOR

(71) Applicant: Google Inc., Mountain View, CA (US)

(72) Inventors: Marc Strauss, Mountain View, CA (US); Michael Patrick Murphy, Mountain View, CA (US)

(73) Assignee: Boston Dynamics, Inc., Waltham, MA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/653,601

(22) Filed: Jul. 19, 2017

Related U.S. Application Data

(63) Continuation of application No. 15/295,245, filed on Oct. 17, 2016, now Pat. No. 9,737,995, which is a continuation of application No. 14/932,013, filed on Nov. 4, 2015, now Pat. No. 9,492,929.

(51) Int. Cl.

| | |
|---|---|
| *B25J 15/10* | (2006.01) |
| *B25J 15/00* | (2006.01) |
| *B25J 15/08* | (2006.01) |
| *B25J 13/08* | (2006.01) |
| *F15B 15/20* | (2006.01) |
| *F15B 15/06* | (2006.01) |
| *F15B 15/14* | (2006.01) |
| *F15B 15/28* | (2006.01) |

(52) U.S. Cl.
CPC ............. *B25J 15/08* (2013.01); *B25J 13/085* (2013.01); *B25J 15/0028* (2013.01); *B25J 15/10* (2013.01); *F15B 15/06* (2013.01); *F15B 15/149* (2013.01); *F15B 15/20* (2013.01); *F15B 15/2807* (2013.01); *Y10S 901/37* (2013.01)

(58) Field of Classification Search
CPC ...... B25J 15/08; B25J 13/085; B25J 15/0028; B25J 15/10; F15B 15/06; F15B 15/149; F15B 15/20; F15B 15/2807; Y10S 901/37
See application file for complete search history.

(56) References Cited

U.S. PATENT DOCUMENTS

| | | |
|---|---|---|
| 4,591,199 A | 5/1986 | Zajac |
| 4,660,877 A | 4/1987 | Schmidt |
| 4,715,773 A | 12/1987 | Parker |
| 4,907,834 A | 3/1990 | deJong |
| 5,641,190 A | 6/1997 | Christensen |
| 6,056,341 A | 5/2000 | Bliss |
| 6,428,070 B1 | 8/2002 | Takanashi |
| 6,938,938 B2 | 9/2005 | Risle |

(Continued)

*Primary Examiner* — Dean J Kramer
(74) *Attorney, Agent, or Firm* — Honigman Miller Schwartz and Cohn LLP

(57) ABSTRACT

Examples described here include a device that has a housing defining a cavity, and a force sensor. The device also includes a first hydraulic actuator positioned in the cavity, and a second hydraulic actuator positioned in the cavity. The first and second hydraulic actuators move between respectively relaxing modes and thrusting modes along respective longitudinal axes. The longitudinal axis of the first hydraulic actuator is substantially parallel to the longitudinal axis of the second hydraulic actuator. The device also includes a first actuated member coupled to the first hydraulic actuator, and a second actuated member coupled to the second hydraulic actuator.

15 Claims, 9 Drawing Sheets

(56) References Cited

U.S. PATENT DOCUMENTS

| | | | |
|---|---|---|---|
| 7,837,247 B2 | 11/2010 | Waldorf | |
| 9,492,929 B1 | 11/2016 | Strauss | |
| 9,737,995 B1 * | 8/2017 | Strauss | B25J 15/10 |
| 2010/0156125 A1 | 6/2010 | Lee | |

* cited by examiner

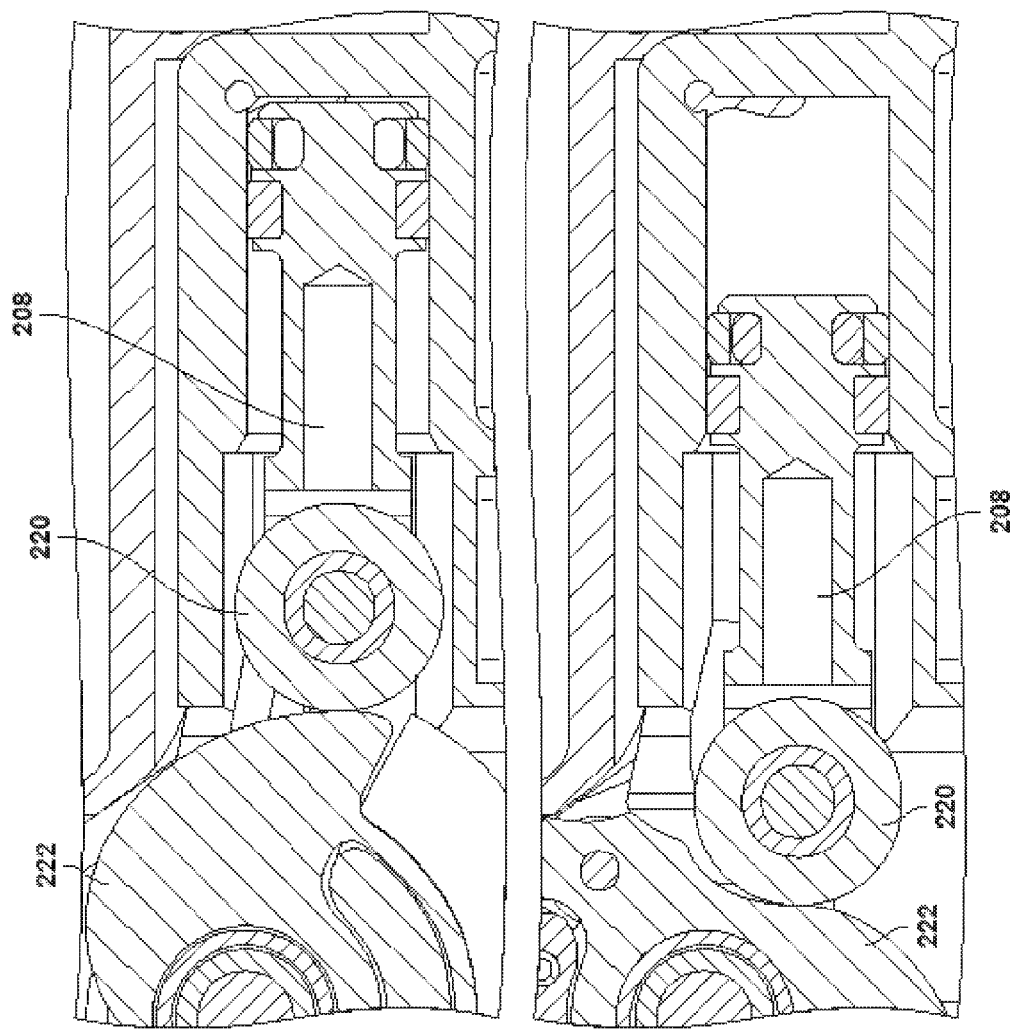

FLAT GRIPPER ACTUATOR

CROSS-REFERENCE TO RELATED APPLICATION

This application is a continuation of U.S. patent application Ser. No. 15/295,245 filed on Oct. 17, 2016, and entitled "Flat Gripper Actuator," which is a continuation of U.S. patent application Ser. No. 14/932,013 (now U.S. Pat. No. 9,492,929), filed on Nov. 4, 2015, and entitled "Flat Gripper Actuator," all of which are herein incorporated by reference as if fully set forth in this description.

BACKGROUND

Robotic systems, such as a robotic arm containing a gripping component, may be used for applications involving picking up or moving objects. For instance, a robotic device may be used to create a stack of objects, load objects to a given area, or unload objects from a given area. In some cases, all of the objects that the robotic system is to manipulate may be of the same type. In other cases, such objects may have varying weights and sizes. Further, such robotic systems may direct a robotic arm to pick up objects based on predetermined knowledge of where objects are in the environment. Such robotic systems may also direct a robotic arm to pick up objects based on predetermined knowledge of what types of objects the robotic arm can manage (e.g., based on whether a gripper or other robotic manipulator can support a weight of the object while moving or otherwise interacting with the object at various accelerations).

SUMMARY

Example systems and methods may provide for actuating a robotic gripper that includes at least two hydraulic actuators positioned parallel to one another in respective cavities of the palm of the robotic gripper. The hydraulic actuators may be coupled to actuated members for gripping various objects. By placing the hydraulic actuators in the plane of the palm of the robotic gripper, the height of the palm is minimized. By reducing the palm height, the effective payload is increased and the workspace reorientation envelope is reduced in size.

In one aspect, the present application describes a device. The device may include a housing defining a cavity. The device may further include a force sensor. The device may further include a first hydraulic actuator positioned in the cavity, wherein the first hydraulic actuator moves between a first relaxing mode and a first thrusting mode along a longitudinal axis of the first hydraulic actuator based at least in part in response to sensor data from the force sensor. The device may further include a second hydraulic actuator positioned in the cavity, wherein the second hydraulic actuator moves between a second relaxing mode and a second thrusting mode along a longitudinal axis of the second hydraulic actuator based at least in part in response to sensor data from the force sensor, and wherein the longitudinal axis of the first hydraulic actuator is substantially parallel to the longitudinal axis of the second hydraulic actuator. The device may further include a first actuated member coupled to the first hydraulic actuator, wherein the first actuated member is in a first open mode when the first hydraulic actuator is in the first relaxing mode, and wherein the first actuated member is in a first closed mode when the first hydraulic actuator is in the first thrusting mode. The device may further include a second actuated member coupled to the second hydraulic actuator, wherein the second actuated member is in a second open mode when the second hydraulic actuator is in the second relaxing mode, and wherein the second actuated member is in a second closed mode when the second hydraulic actuator is in the second thrusting mode.

In another aspect, the present application describes a robotic device. The robotic device may include a first limb, and a second limb coupled to the first limb. The robotic device may further include a gripping component coupled to the second limb, wherein the gripping component comprises (i) a housing defining a cavity, (ii) a force sensor, (iii) a first hydraulic actuator positioned in the cavity, wherein the first hydraulic actuator moves between a first relaxing mode and a first thrusting mode along a longitudinal axis of the first hydraulic actuator, (iv) a second hydraulic actuator positioned in the cavity, wherein the second hydraulic actuator moves between a second relaxing mode and a second thrusting mode along a longitudinal axis of the second hydraulic actuator, and wherein the longitudinal axis of the first hydraulic actuator is substantially parallel to the longitudinal axis of the second hydraulic actuator, (v) a first gripping member coupled to the first hydraulic actuator, and (vi) a second gripping member coupled to the second hydraulic actuator. The robotic device may further include a controller comprising at least one processor and data storage comprising instructions executable by the at least one processor to cause the controller to perform operations. The operations may include, based at least in part in response to sensor data from the force sensor, causing the first and second hydraulic actuators to move between the first and second relaxing modes and the first and second thrusting modes to thereby cause movements of the first and second gripping members toward each other so as to grasp one or more objects.

In another aspect, the present application describes a method for actuating a device comprising (i) a housing defining a cavity, (ii) a force sensor, (iii) a first hydraulic actuator positioned in the cavity, wherein the first hydraulic actuator moves between a first relaxing mode and a first thrusting mode along a longitudinal axis of the first hydraulic actuator, (iv) a second hydraulic actuator positioned in the cavity, wherein the second hydraulic actuator moves between a second relaxing mode and a second thrusting mode along a longitudinal axis of the second hydraulic actuator, and wherein the longitudinal axis of the first hydraulic actuator is substantially parallel to the longitudinal axis of the second hydraulic actuator, (v) a first gripping member coupled to the first hydraulic actuator, and (vi) a second gripping member coupled to the second hydraulic actuator. The method may involve receiving, at a control system configured to actuate the device, data indicative of a distinct location of an object in an environment of the device and further indicative of a dimension of the object. The method may also involve, based on the location and dimension of the object, determining a position to which to rotate each of the first and second gripping members such that the object is located between the first and second gripping members. The method may further involve causing the first and second gripping members to rotate to the determined position. The method may still further involve, receiving, at the control system, sensor data from the force sensor. The method may yet still further involve, in response to the received sensor data, causing movement of the first and second gripping members so as to grasp the object.

In yet another aspect, a system is provided that includes a means for actuating a device comprising (i) a housing defining a cavity, (ii) a force sensor, (iii) a first hydraulic actuator positioned in the cavity, wherein the first hydraulic actuator moves between a first relaxing mode and a first thrusting mode along a longitudinal axis of the first hydraulic actuator, (iv) a second hydraulic actuator positioned in the cavity, wherein the second hydraulic actuator moves between a second relaxing mode and a second thrusting mode along a longitudinal axis of the second hydraulic actuator, and wherein the longitudinal axis of the first hydraulic actuator is substantially parallel to the longitudinal axis of the second hydraulic actuator, (v) a first gripping member coupled to the first hydraulic actuator, and (vi) a second gripping member coupled to the second hydraulic actuator. The system may also include a means for receiving data indicative of a distinct location of an object in an environment of the device and further indicative of a dimension of the object. The system may further include a means for based on the location and dimension of the object, determining a position to which to rotate each of the first and second gripping members such that the object is located between the first and second gripping members. The system may still further include a means for causing the first and second gripping members to rotate to the determined position. The system may yet still further include a means for receiving sensor data from the force sensor. The system may yet still further include a means for in response to the received sensor data, causing movement of the first and second gripping members so as to grasp the object.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

FIG. 2E illustrates an element of the component of FIG. 2A, according to an example implementation.

DETAILED DESCRIPTION

Figure 1:
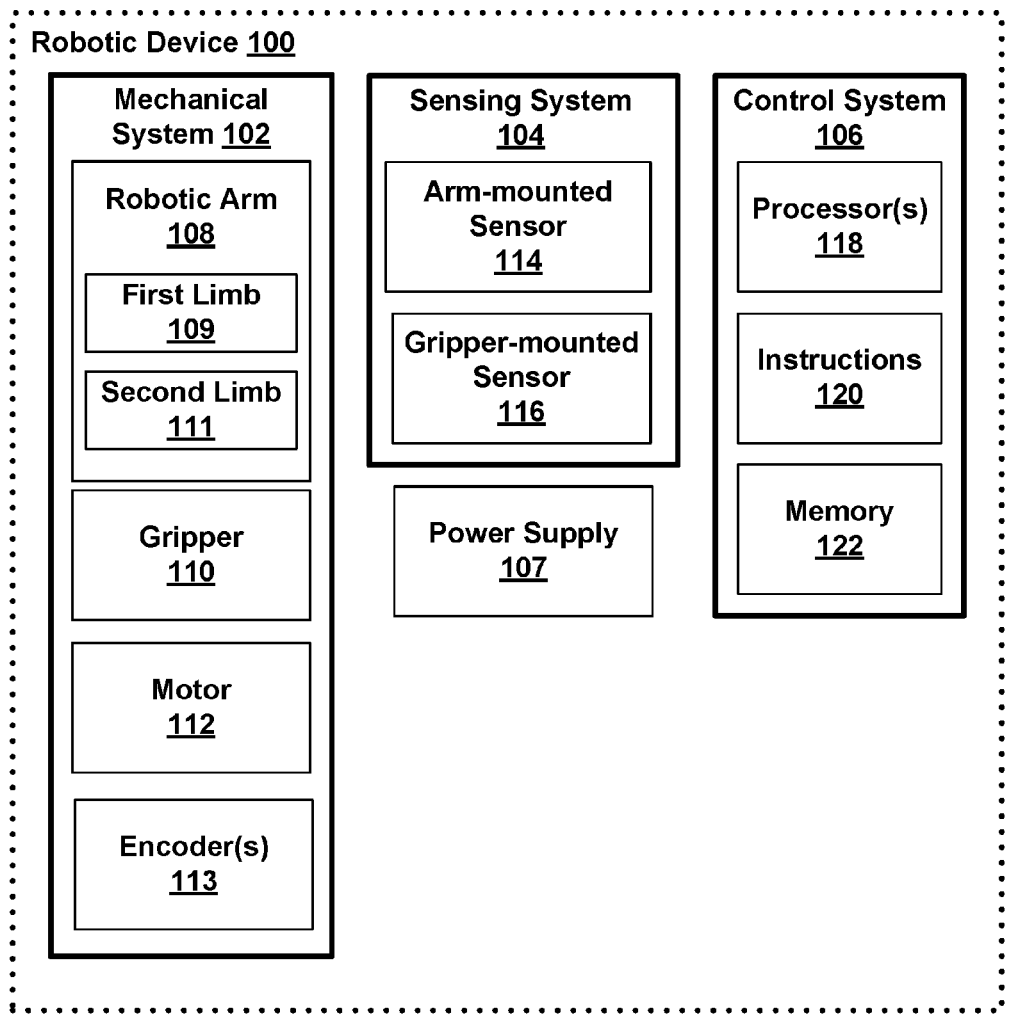
FIG. 1 is an operational block diagram illustrating a robotic device, according to an example implementation.

Example methods and systems are described herein. Any example implementation or feature described herein is not necessarily to be construed as preferred or advantageous over other implementations or features. The example implementations described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other implementations might include more or less of each element shown in a given Figure. Further, some of the illustrated elements may be combined or omitted. Yet further, an example implementation may include elements that are not illustrated in the Figures.

In the following description the term "substantially" may be used such that the recited characteristic, parameter, or value need not be achieved exactly, but that deviations or variations, including for example, tolerances, measurement error, measurement accuracy limitations, manufacturing deviations and other factors known to skill in the art, may occur in amounts that do not preclude the effect the characteristic was intended to provide.

In addition, in the following description, the terms "robotic gripper," "actuated member," "gripping member," and "robotic manipulator" may be used interchangeably to refer to a component of a robotic device operable to manipulate objects (e.g., grab, move, drop, etc.).

In practice, robotic gripper operation can be limited in various ways. By way of example, the maximum effective payload of an example gripper may be limited due to a distance between a palm of the gripper and a wrist of the gripper. Such a distance between the wrist and an object grabbed by the gripper defines a moment arm, therefore decreasing the distance between the palm and the wrist may be advantageous. Therefore, it may be desirable to have a robotic gripper with a decreased palm height in order to facilitate efficient object manipulation.

Described herein is a robotic device including such a gripper apparatus and further including a control system configured to actuate the gripper. Unless otherwise indicated herein, it should be assumed that actuation of the gripper and its various components is controlled either directly or indirectly by such a control system.

In some embodiments, such a device may include a housing defining a cavity, and a force sensor. The device may further include a first hydraulic actuator positioned in the cavity. The first hydraulic actuator moves between a first relaxing mode and a first thrusting mode along a longitudinal axis of the first hydraulic actuator. The first hydraulic actuator may be configured to move between the first relaxing mode and the first thrusting mode based at least in part in response to sensor data from the force sensor. For example, the sensor data may be indicative of the gripper contacting an object. The device may further include a second hydraulic actuator positioned in the cavity. The second hydraulic actuator may be configured to move between a second relaxing mode and a second thrusting mode along a longitudinal axis of the second hydraulic actuator based at least in part in response to sensor data from the force sensor. The longitudinal axis of the first hydraulic actuator is substantially parallel to the longitudinal axis of the second hydraulic actuator. The gripper may further include a first actuated member coupled to the first hydraulic actuator, and a second actuated member coupled to the second hydraulic actuator.

In operation, the first actuated member may be configured to be in a first open mode when the first hydraulic actuator is in the first relaxing mode, and in a first closed mode when the first hydraulic actuator is in the first thrusting mode. Similarly, the second actuated member may be configured to be in a second open mode when the second hydraulic actuator is in the second relaxing mode, and in a second closed mode when the second hydraulic actuator is in the second thrusting mode.

The device may also include a control system to actuate the actuated members. The control system can perform various operations with respect to such an arrangement for a gripper apparatus. By way of example, the control system can cause the actuated members to grasp an object. For instance, the control system may receive data indicative of an object in an environment of the robotic device, the data including a location of the object in the environment. Based on the location of the object, the control system may determine a position to which to rotate each of the first and second actuated members such that the object is located between the first and second actuated members. The control system may further cause the first and second actuated members to rotate to the determined position, and further cause movement of the first and second actuated members so as to grasp the object.

It should be understood that the above examples are provided for illustrative purposes, and should not be construed as limiting. As such, the implementations herein may additionally or alternatively includes other features or includes fewer features, without departing from the scope of the invention.

Reference will now be made in more detail to various implementations of the robotic device described above, examples of which are illustrated in the accompanying drawings. In the following detailed description, numerous specific details are set forth in order to provide a thorough understanding of the present disclosure and the described implementations. However, the present disclosure may be practiced without these specific details. In other instances, well-known methods, procedures, components, and circuits have not been described in detail so as not to unnecessarily obscure aspects of the example implementations.

FIG. 1 is a functional block diagram illustrating a robotic device 100, according to an example implementation. The robotic device 100 could include various subsystems such as a mechanical system 102, a sensing system 104, a control system 106, as well as a power supply 107. The robotic device 100 may include more or fewer subsystems and each subsystem could include multiple elements. Further, each of the subsystems and elements of robotic device 100 could be interconnected. Thus, one or more of the described operations of the robotic device 100 may be divided up into additional operational or physical components, or combined into fewer operational or physical components. In some examples, additional operational and/or physical components may be added to the examples illustrated by FIG. 1.

The mechanical system 102 may include components such as a robotic arm 108, a gripper 110, and a motor 112. The robotic arm 108 may include a first limb 109 coupled to a second limb 111, and the gripper 110 may be coupled to the second limb. Motor 112 may be an electric motor powered by electrical power, or may be powered by a number of different energy sources, such as a gas-based fuel or solar power. Additionally, motor 112 may be configured to receive power from power supply 107. The power supply 107 may provide power to various components of robotic device 100 and could represent, for example, a rechargeable lithium-ion or lead-acid battery. Other power supply materials and types are also possible.

One or more encoder(s) 113 may be coupled to the gripper 110. In particular, the gripper 110 may include a first gripping member and a second gripping member. In such an example, a first encoder may be coupled to the first gripping member to provide data indicative of motion of the first gripping member. Similarly, a second encoder may be coupled to the second gripping member to provide data indicative of motion of the second gripping member. For example, the encoder(s) 113 may include a rotary encoder, a shaft encoder, or any other electro-mechanical device configured to convert an angular or linear position/motion of the first gripping member and/or second gripping member to an analog or digital signal (e.g., the data, etc.). Various implementations are possible for the encoder(s) 113 such as mechanical (e.g., metal disc containing a set of concentric rings of openings), optical (e.g., glass/plastic with transparent and opaque areas), magnetic (e.g., disc that includes a series of magnetic poles), capacitive (e.g., asymmetrical shaped disc rotated within the encoder to adjust capacitance between two electrodes), or any other implementation.

In some examples, the data provided by the encoder(s) 113 may indicate a change in a position (e.g., orientation) of, respectively, the first gripping member and/or the second gripping member of the gripper 110. Further, for example, the encoder(s) 113 may provide a signal (e.g., index pulse, etc.) indicative of the first gripping member and/or the second gripping member being at a particular orientation.

Accordingly, in some examples, the encoder(s) 113 may include an incremental encoder configured to provide the data indicative of a change in the orientation of the first gripping member and/or the second gripping member of the gripper 110. In these examples, the device 100 may cause a first actuator to rotate the first gripping member and/or a second actuator to rotate the second gripping member, respectively, until the signal (e.g., index pulse, etc.) of the encoder(s) 113 is detected to determine the particular orientations of the first gripping member and/or the second gripping member.

Additionally or alternatively, in some examples, the encoder(s) may include an absolute encoder configured to provide the data. The absolute encoder, for example, may be configured to detect motion/change in orientations of the first gripping member and/or the second gripping member even if the absolute encoder is not provided with power. In these examples, the encoder(s) 113 may provide the data indicative of the orientations of the first gripping member and/or the second gripping member without the device 100 rotating a given gripping member until the signal (e.g., index pulse) is received from the encoder(s).

The sensing system 104 may use one or more sensors attached to a robotic arm 108, such as sensor 114. The sensing system 104 may also use one or more sensors attached to the gripper 110, such as sensor 116. Within examples, these sensors may include force or torque sensors that can be mounted on the robotic arm and/or gripper and thereby sense forces/torques experienced by the robotic arm and/or by one or more gripping fingers (or other gripping surfaces) of the gripper. Additionally or alternatively, these sensors may include cameras configured to acquire images of the environment of the robotic device. Additionally or alternatively, these sensors may include 2D sensors and/or 3D depth sensors that sense information about the environment as the robotic arm 108 and/or the gripper 110 moves. The sensing system 104 may determine information about the environment that can be used by control system 106 (e.g., a computer running motion planning software) to navigate the robotic arm and/or gripper through the workplace into a position for picking and moving objects efficiently, for instance. The control system 106 could be located on the device or could be in remote communication with the device.

In some arrangements of the robotic device 100, the power supply 107 may supply power to the gripper 110 (e.g., to the fingers or other gripping surface(s) of the gripper) to be transmitted in turn from the gripper to various devices that the gripper is grasping or otherwise in contact with. Within examples, power may be transmitted through the gripper to power specialized tools such as drivers, wrenches, drills, cutters, saws, etc. Within additional examples, the gripper may contact a rechargeable battery or other device in need of power in order to transmit power to that device. To facilitate such a transmission of power in practice, plated contact pads or similar electrical contacts may be present on both the gripper and the devices that the gripper touches, in order to establish an electrical connection between the gripper and those devices.

Many or all of the operations of robotic device 100 could be controlled by control system 106. Control system 106 may include at least one processor 118 (which could include at least one microprocessor) that executes instructions 120 stored in a non-transitory computer readable medium, such as the memory 122. The control system 106 may also represent a plurality of computing devices that may serve to control individual components or subsystems of the robotic device 100 in a distributed fashion. Within examples, control system 106 may be configured to control operation of the gripper 110. Alternatively, the robotic device may include a control system for the gripper that is separate from control system 106 and that is configured to access data from and share data with control system 106.

In some implementations, memory 122 may contain instructions 120 (e.g., program logic) executable by the processor 118 to execute various operations of robotic device 100, including those described in connection with FIGS. 2A, 2B, 2C, 2D, and 2E, and FIGS. 3A, 3B, 3C, and 3D below. Memory 122 may contain additional instructions as well, including instructions to transmit data to, receive data from, interact with, and/or control one or more of the mechanical system 102, the sensing system 104, and/or the control system 106.

Figure 2A:
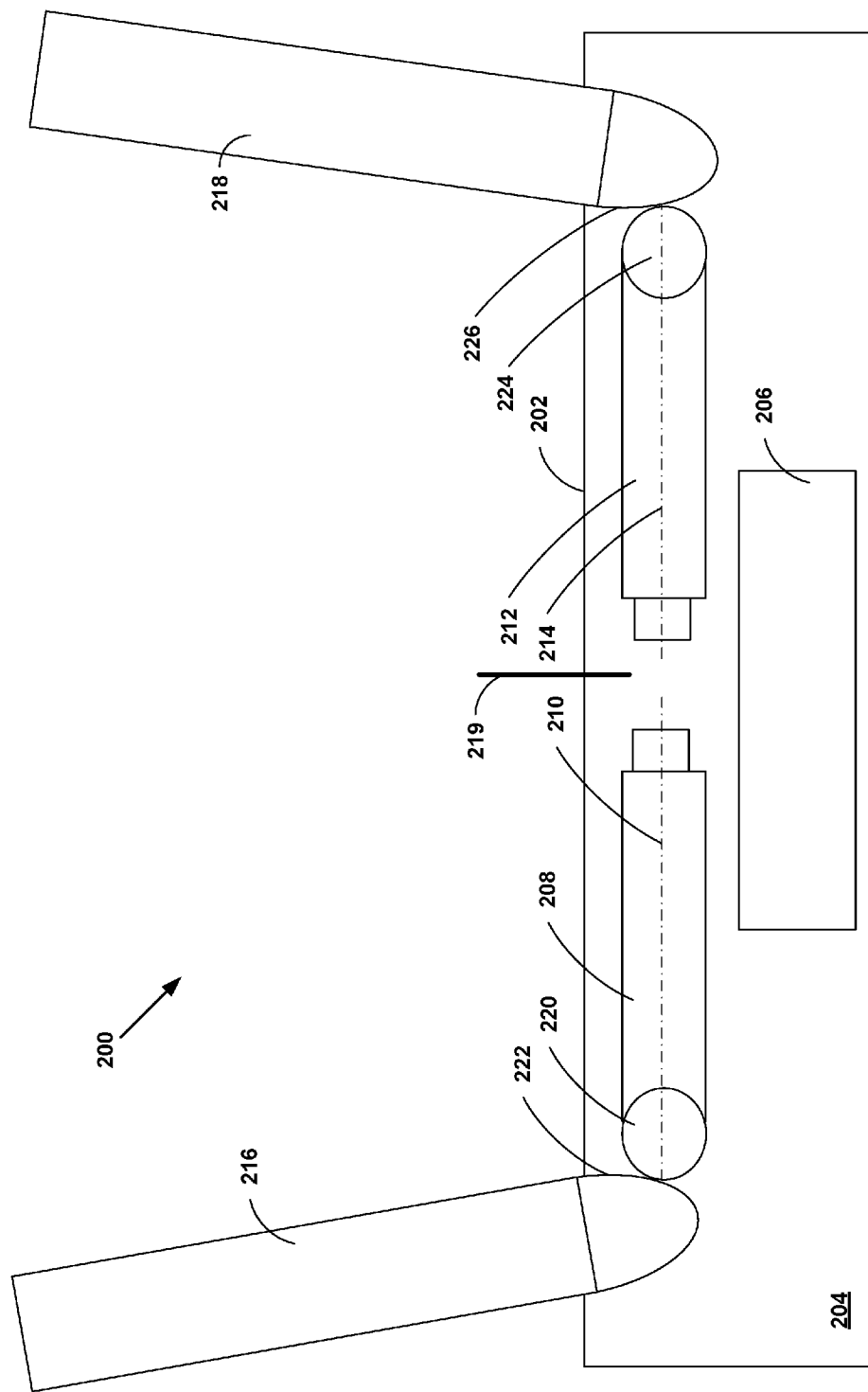
FIG. 2A illustrates a cross-sectional view of a robotic gripper in a relaxed mode, according to an example implementation.

FIG. 2A is a side view of an example gripper 200, according to an example embodiment. As shown in FIG. 2A, the gripper 200 may include a housing 202 defining a cavity 204. The housing 202 may define a palm of the gripper 200. The gripper 200 may also include a force sensor 206 positioned inside of the cavity 204. In another example, the force sensor 206 may be positioned adjacent to and outside of the cavity 204. Other locations for the force sensor 206 are possible as well. The gripper 200 may further include a first hydraulic actuator 208 positioned in the cavity 204. The first hydraulic actuator 208 moves between a first relaxing mode and a first thrusting mode along a longitudinal axis of the first hydraulic actuator 210. The first hydraulic actuator 208 is shown in the first relaxing mode in FIG. 2A. The first hydraulic actuator 208 may be configured to move between the first relaxing mode and the first thrusting mode based at least in part in response to sensor data from the force sensor 206. For example, the sensor data may be indicative of the gripper 200 contacting an object. As another example, the sensor data may be indicative of the gripper 200 contacting a surface on which the object is resting. Other examples of force sensor data are possible as well.

The gripper 200 may further include a second hydraulic actuator 212 positioned in the cavity 204. The second hydraulic actuator 212 may be configured to move between a second relaxing mode and a second thrusting mode along a longitudinal axis of the second hydraulic actuator 214. The second hydraulic actuator 212 is shown in the second relaxing mode in FIG. 2A. Similar to the first hydraulic actuator 208, the second hydraulic actuator 212 may be configured to move between the second relaxing mode and the second thrusting mode based at least in part in response to sensor data from the force sensor 206. As shown in FIG. 2A, the longitudinal axis of the first hydraulic actuator 210 is substantially parallel to the longitudinal axis of the second hydraulic actuator 214. The gripper 200 may further include a first actuated member 216 coupled to the first hydraulic actuator 208, and a second actuated member 218 coupled to the second hydraulic actuator 212.

By placing the hydraulic actuators 208, 212 in the plane of the housing 202 of the gripper 200, the height of the housing 202 can be minimized. As such, a profile of the housing 202 may be defined by a height of the first hydraulic actuator 208 and a height of the second hydraulic actuator 212. In particular, the height of the housing 202 may be slightly larger than a diameter of the actuators 208, 212 such that the actuators 208, 212 just fit in the cavity 204. By reducing the height of the housing 202, the effective payload is increased and the workspace reorientation envelope is reduced in size.

Figure 2B:
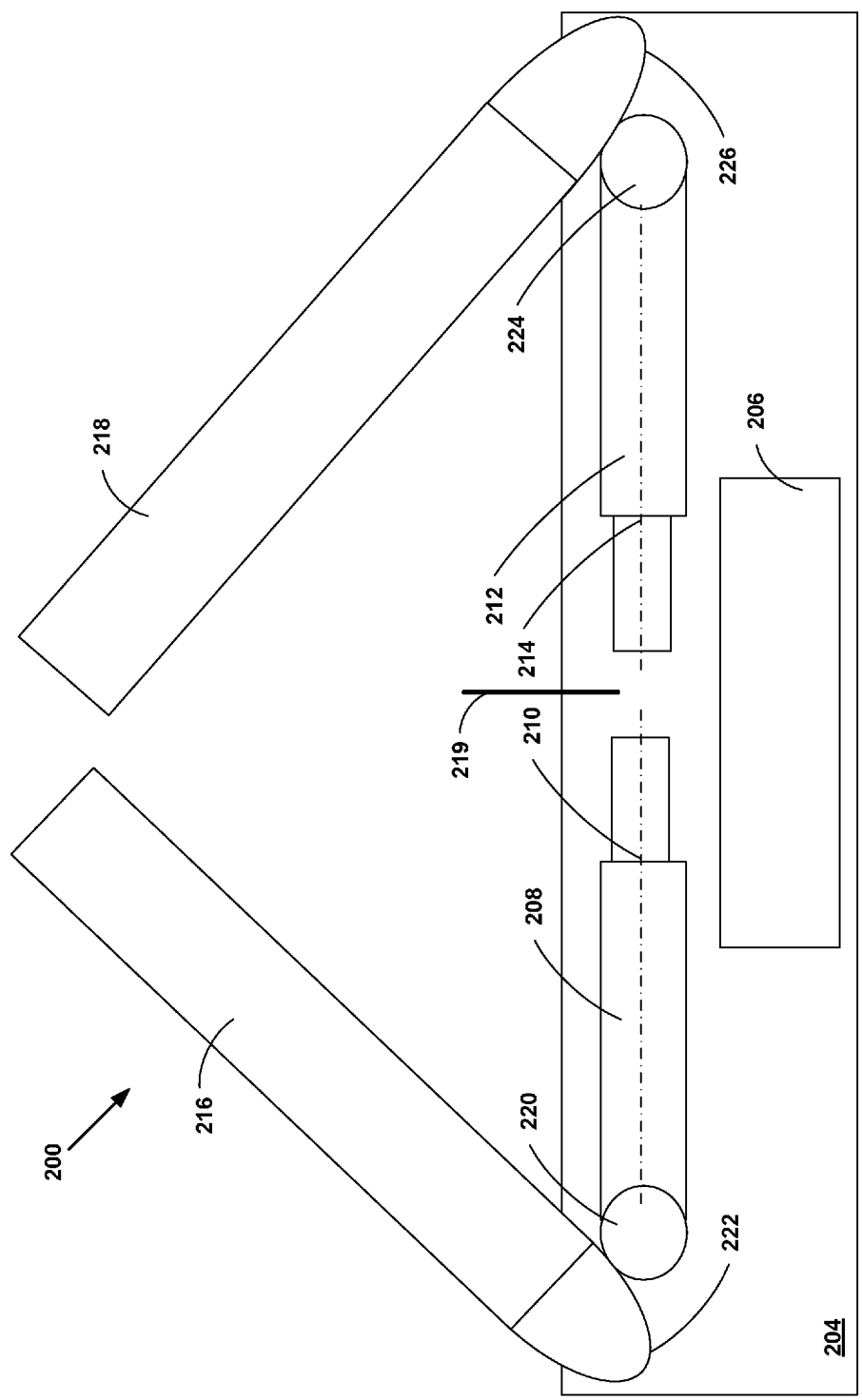
FIG. 2B illustrates a cross-sectional view of the robotic gripper of FIG. 2A in a gripping mode, according to an example implementation.

In operation, the first actuated member 216 may be configured to be in a first open mode when the first hydraulic actuator 208 is in the first relaxing mode, as shown in FIG. 2A. Similarly, the second actuated member 218 may be configured to be in a second open mode when the second hydraulic actuator 212 is in the second relaxing mode, as shown in FIG. 2A. In response to sensor data from the force sensor 206, the first actuated member 216 may be configured to transition to a first closed mode as the first hydraulic actuator 208 is in the first thrusting mode, and the second actuated member 218 may be configured to transition to a second closed mode as the second hydraulic actuator 212 is in the second thrusting mode. Such a configuration is illustrated in FIG. 2B.

Although the actuators described herein refer to hydraulic actuators, other kinds of actuators are possible as well, such as pneumatic actuators, or electrical actuators. In the hydraulic actuator example, the actuators 208, 212 are activated by hydraulic pressure, such that when an actuator is configured in the thrusting mode, pressurized hydraulic fluid is applied in a chamber behind the corresponding piston of the actuator. When an actuator is configured to be in the relaxing mode, hydraulic fluid is allowed to flow at least unimpeded (and optionally assisted by suction) out of the chamber. Similar principles apply if the actuators are powered by pneumatics, solenoids or other power sources.

In one example, the gripper 200 may further include a hydraulic channel in fluid communication with both the first hydraulic actuator 208 and the second hydraulic actuator 212 such that a pressure applied to the first actuated member 216 is equal to a pressure applied to the second actuated member 218. In another example, or as a result of a hardware reconfiguration, the gripper 200 may include a first hydraulic channel in fluid communication with the first hydraulic actuator 208, and a second hydraulic channel in fluid communication with the second hydraulic actuator 212. In such an example, the first actuated member 216 and the second actuated member 218 may be individually controllable by pressurized hydraulic fluid from the first hydraulic channel and the second hydraulic channel, respectively. As such, a pressure applied to the first actuated member 216 may be different than a pressure applied to the second actuated member 218.

In yet another example, the gripper 200 may include a removable sealing component 219 which configures the first hydraulic channel in fluid communication with the first hydraulic actuator 208 to be sealed off from the second hydraulic channel in fluid communication with the second hydraulic actuator 212, such that the first actuated member 216 and the second actuated member 218 are individually controllable by pressurized hydraulic fluid from the first hydraulic channel and the second hydraulic channel, respectively. As such, a pressure applied to the first actuated member 216 may be different than a pressure applied to the second actuated member 218. The removable sealing component 219 may take the form of a removable pin, for example. As such, a user may be able to easily switch the gripper 200 between a coupled-mode where a pressure applied to the first actuated member 216 is equal to a pressure applied to the second actuated member 218, and an individually-controllable mode where the first actuated member 216 and the second actuated member 218 are individually controllable.

As shown in FIGS. 2A and 2B, the first hydraulic actuator 208 may include a first roller surface 220 that contacts a first cam surface 222 of the first actuated member 216 to thereby couple the first actuated member 216 to the first hydraulic actuator 208. Similarly, the second hydraulic actuator 212 may include a second roller surface 224 that contacts a second cam surface 226 of the second actuated member 218 to thereby couple the second actuated member 218 to the second hydraulic actuator 212. In one example, the first cam surface 222 and the second cam surface 226 are involute cams, such that a rotation of the first actuated member 216 and the second actuated member 218 are proportional to the linear displacement of the respective actuators.

Figure 2C:
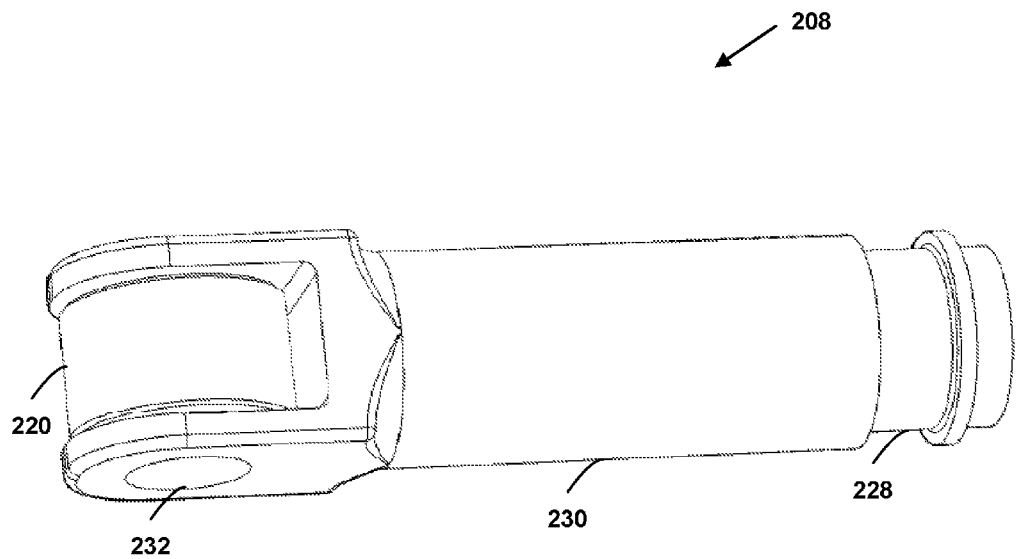
FIG. 2C illustrates an element of the component of FIG. 2A, according to an example implementation.

FIG. 2C illustrates an example first hydraulic actuator 208, according to an example embodiment. As shown in FIG. 2C, the first hydraulic actuator 208 may include a piston 228 positioned inside of a rod 230. An end of the rod 230 may include a roller 220 that is coupled to the rod 230 via a pin joint 232. The roller 220 may be configured to contact the first cam surface 222, as discussed above. Although FIG. 2C references the first hydraulic actuator 208, the second hydraulic actuator 212 may be similarly configured.

In another embodiment, the first hydraulic actuator 208 may be coupled to the first actuated member 216 via a first pin joint link, and the second hydraulic actuator 212 may be coupled to the second actuated member 218 via a second pin joint link. In another example, a four-bar linkage may be used to couple the actuated members 216, 218 to the respective hydraulic actuators 208, 212. Other coupling mechanisms are possible as well.

Further, the gripper 200 may include a first biasing member that biases the first hydraulic actuator 208 to the first relaxing mode, and a second biasing member that biases the second hydraulic actuator 212 to the second relaxing mode. In one example, such biasing members may be torsion springs. In another example, the hydraulic actuators may receive constant pressure from pressurized hydraulic fluid that bias the actuators to their respective relaxing modes. Other example biasing members are possible as well.

Figure 2D:
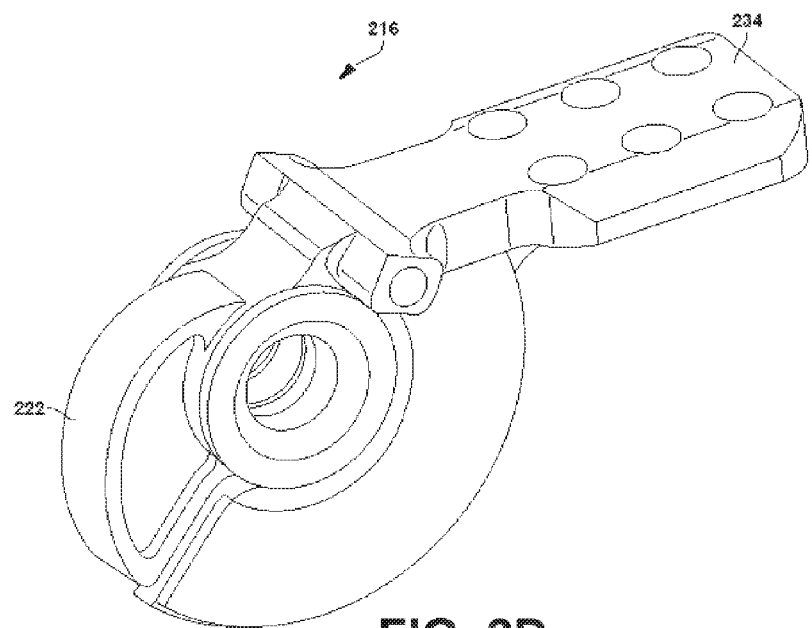
FIG. 2D illustrates an element of the component of FIG. 2A, according to an example implementation.

FIG. 2D illustrates an example first actuated member 216, according to an example embodiment. As shown in FIG. 2D, the first actuated member 216 may include a first cam surface 222, and a surface 234. The surface 234 may be used to couple a gripping member to the first actuated member 216. In one example, the surface 234 may be configured to enable a quick coupling and decoupling of a variety of gripping members, such that a particular gripping member could be used for a particular use case.

FIG. 2E illustrates a close up view of the first hydraulic actuator 208 as it transitions from the first relaxing mode to the first thrusting mode. As shown in FIG. 2E, the first roller surface 220 contacts the first cam surface 222, thereby causing the first actuated member to rotate as the first roller surface 220 moves along the first cam surface 222. This rotation may be transferred to a gripping member coupled to the first actuated member 216. Although FIG. 2E references the first hydraulic actuator 208, the second hydraulic actuator 212 may be similarly configured.

Figure 3A:
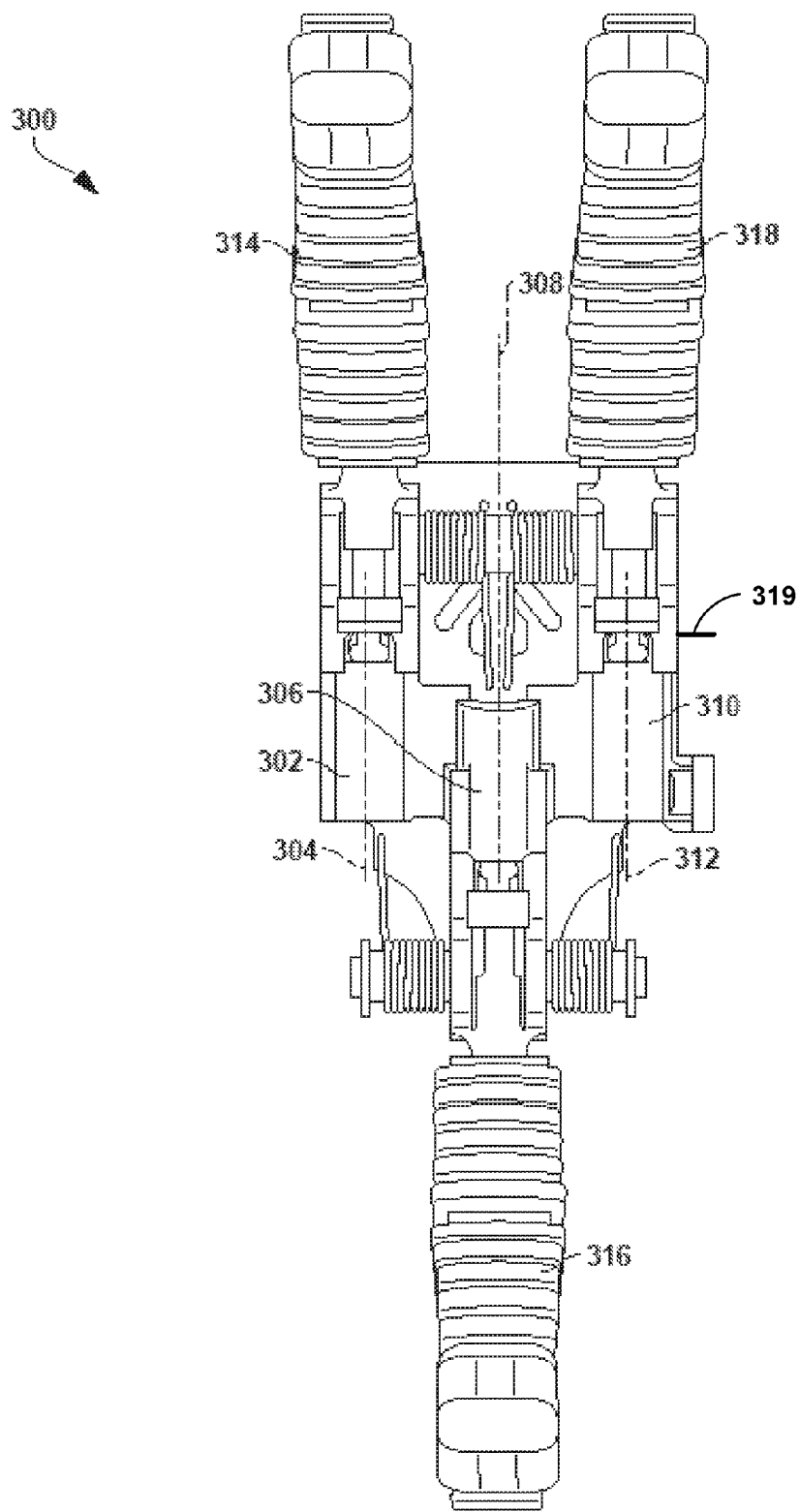
FIG. 3A illustrates a robotic gripper, according to an example implementation.

FIG. 3A illustrates a top view of another gripper 300, according to an example embodiment. The gripper 300 may include a housing defining a cavity. The housing may define a palm of the gripper 300. The gripper 300 may also include a force sensor, similar to the example illustrated in FIGS. 2A-2B. The gripper 300 may further include a first hydraulic actuator 302 positioned in the cavity. The first hydraulic actuator 302 moves between a first relaxing mode and a first thrusting mode along a longitudinal axis of the first hydraulic actuator 304. The first hydraulic actuator 302 is shown in the first relaxing mode in FIG. 3A. The first hydraulic actuator 302 may be configured to move between the first relaxing mode and the first thrusting mode based at least in part in response to sensor data from the force sensor. For example, the sensor data may be indicative of the gripper 300 contacting an object. As another example, the sensor data may be indicative of the gripper 300 contacting a surface on which the object is resting. Other examples of sensor data are possible as well.

The gripper 300 may further include a second hydraulic actuator 306 positioned in the cavity. The second hydraulic actuator 306 may be configured to move between a second relaxing mode and a second thrusting mode along a longitudinal axis of the second hydraulic actuator 308. The second hydraulic actuator 306 is shown in the second relaxing mode in FIG. 3A. Similar to the first hydraulic actuator 302, the second hydraulic actuator 306 may be configured to move between the second relaxing mode and the second thrusting mode based at least in part in response to sensor data from the force sensor. As shown in FIG. 3A, the longitudinal axis of the first hydraulic actuator 304 is substantially parallel to the longitudinal axis of the second hydraulic actuator 308.

The gripper 300 may further include a third hydraulic actuator 310 positioned in the cavity. The third hydraulic actuator 310 may be configured to move between a third relaxing mode and a third thrusting mode along a longitudinal axis of the third hydraulic actuator 312. The third hydraulic actuator 310 is shown in the second relaxing mode in FIG. 3A. Similar to the first hydraulic actuator 302 and the second hydraulic actuator 306, the third hydraulic actuator 310 may be configured to move between the third relaxing mode and the third thrusting mode based at least in part in response to sensor data from the force sensor. As shown in FIG. 3A, the longitudinal axis of the first hydraulic actuator 304 and the longitudinal axis of the second hydraulic actuator 308 are substantially parallel to the longitudinal axis of the third hydraulic actuator 312.

As discussed above, by placing the hydraulic actuators 302, 306, 310 in the plane of the housing of the gripper 300, the height of the housing can be minimized. As such, a profile of the housing may be defined by a height of the first hydraulic actuator 302, a height of the second hydraulic actuator 306, and a height of the third hydraulic actuator 310. In particular, the height of the housing may be slightly larger than a diameter of the actuators 302, 306, 310 such that the actuators 302, 306, 310 just fit in the cavity. By reducing the height of the housing, the effective payload is increased and the workspace reorientation envelope is reduced in size.

The gripper 300 may further include a first actuated member 314 coupled to the first hydraulic actuator 302, a second actuated member 316 coupled to the second hydraulic actuator 306, and a third actuated member 318 coupled to the third hydraulic actuator 310.

In operation, the first actuated member 314 may be configured to be in a first open mode when the first hydraulic actuator 302 is in the first relaxing mode, as shown in FIG. 3A. Similarly, the second actuated member 316 may be configured to be in a second open mode when the second hydraulic actuator 306 is in the second relaxing mode, as shown in FIG. 3A. And the third actuated member 318 may be configured to be in a third open mode when the third hydraulic actuator 310 is in the third relaxing mode, as shown in FIG. 3A. In response to sensor data from the force sensor, the first actuated member 314 may be configured to transition to a first closed mode as the first hydraulic actuator 302 is in the first thrusting mode, the second actuated member 316 may be configured to transition to a second closed mode as the second hydraulic actuator 306 is in the second thrusting mode, and the third actuated member 318 may be configured to transition to a third closed mode as the third hydraulic actuator 310 is in the third thrusting mode.

In one example, the gripper 300 may further include a hydraulic channel in fluid communication with each of the first hydraulic actuator 302, the second hydraulic actuator 306, and the third hydraulic actuator 310. As shown in FIG. 3A, the second hydraulic actuator 306 is positioned between the first hydraulic actuator 302 and the third hydraulic actuator 310. In such an example, a torque applied to the second actuated member 316 is approximately double a torque applied to the first actuated member 314 and approximately double a torque applied to the third actuated member 318.

In another example, the gripper 300 may include a first hydraulic channel in fluid communication with the first hydraulic actuator 302, a second hydraulic channel in fluid communication with the second hydraulic actuator 306, and a third hydraulic channel in fluid communication with the third hydraulic actuator 310. In such an example, each of the first actuated member 314, the second actuated member 316, and the third actuated member 318 may be individually controllable by pressurized hydraulic fluid from the first hydraulic channel, the second hydraulic channel, and the third hydraulic channel, respectively. As such, a pressure applied to the first actuated member 314 may be different from a pressure applied to the second actuated member 316, which in turn may be different from a pressure applied to the third actuated member 318.

In yet another example, the gripper 300 may include one or more removable sealing components 319 which configure the first hydraulic channel in fluid communication with the first hydraulic actuator 302 to be sealed off from one or more of a second hydraulic channel in fluid communication with the second hydraulic actuator 306 and a third hydraulic channel in fluid communication with the third hydraulic actuator 310, such that each of the first actuated member 314, the second actuated member 316, and the third actuated member 318 are individually controllable. As such, a pressure applied to the first actuated member 314 may be different from a pressure applied to the second actuated member 316, which in turn may be different from a pressure applied to the third actuated member 318. The removable sealing component 319 may take the form of a removable pin, for example. As such, a user may be able to easily switch the gripper 300 between a coupled-mode where a torque applied to the second actuated member 316 is approximately double a torque applied to the first actuated member 314 and approximately double a torque applied to the third actuated member 318, and an individually-controllable mode where each of the first actuated member 314, the second actuated member 316, and the third actuated member 318 are individually controllable.

Figure 3B:
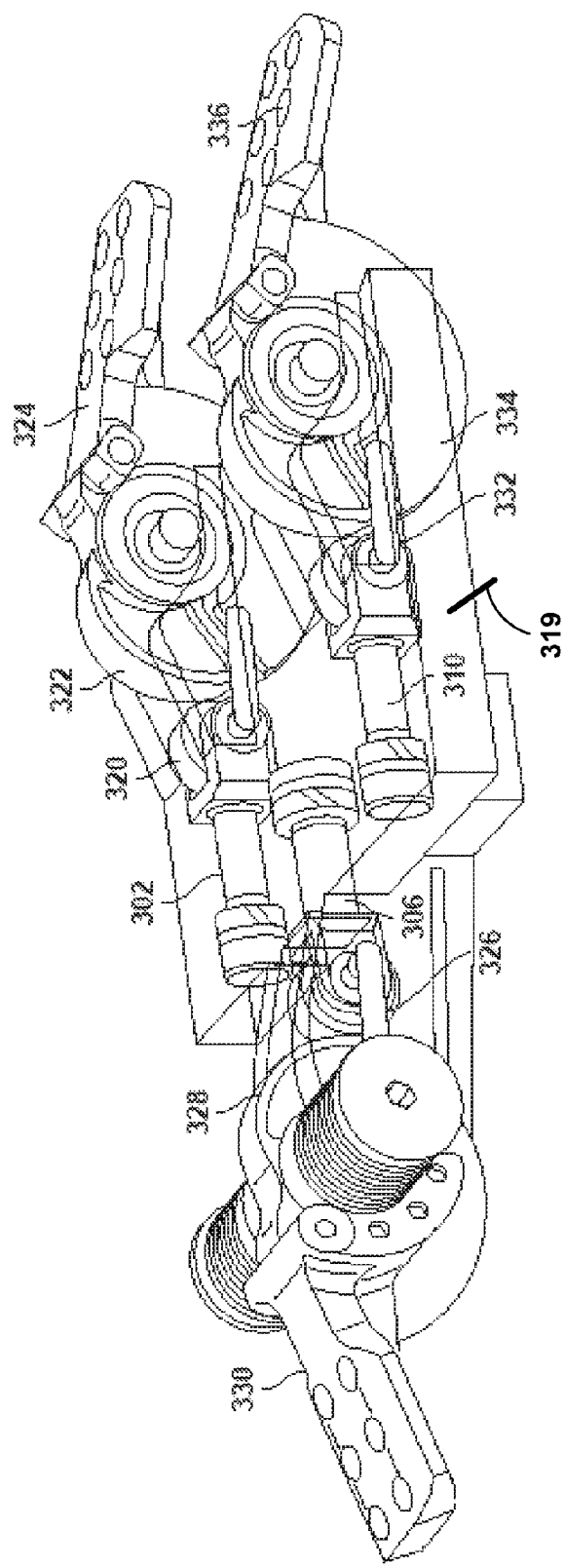
FIG. 3B illustrates an element of the component of FIG. 3A, according to an example implementation.

FIG. 3B illustrates various components of the gripper 300. In particular, FIG. 3B illustrates the first hydraulic actuator 302 including a first roller surface 320. The first roller surface 320 may be configured to contact a first cam surface 322 of the first actuated member 314 to thereby couple the first actuated member 314 to the first hydraulic actuator 302. Further, the first actuated member 314 may include a surface 324. Similarly, the second hydraulic actuator 306 may include a second roller surface 326 configured to contact a second cam surface 328 of the second actuated member 316 to thereby couple the second actuated member 316 to the second hydraulic actuator 306. The second actuated member 316 may further include a surface 330. Further, the third hydraulic actuator 310 may include a third roller surface 332 configured to contact a third cam surface 334 of the third actuated member 318 to thereby couple the third actuated member 318 to the third hydraulic actuator 310. The third actuated member 318 may further include a surface 336. In one example, the first cam surface 322, the second cam surface 328, and the third cam surface 334 are involute cams, such that a rotation of the first actuated member 314, the second actuated member 316, and the third actuated member 318 are proportional to the linear displacement of the respective actuators. Further, in such an example, a contact force between the involute cam surfaces and the corresponding roller surface is always aligned with the longitudinal actuator axis.

A given surface 324, 330, 336 may be used to couple a gripping member to a respective actuated member 314, 316, 318. In one example, such surfaces may be configured to enable a quick coupling and decoupling of a variety of gripping members, such that a particular gripping member could be used for a particular use case.

Figure 3D:
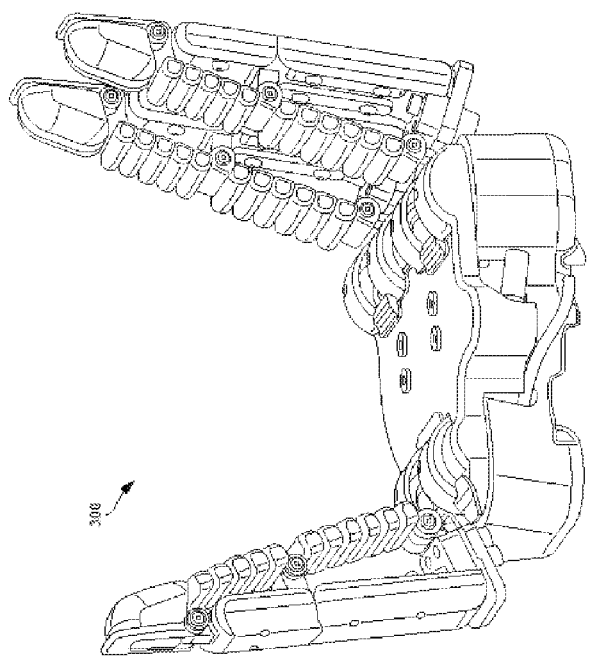
FIG. 3D illustrates example gripping members, according to an example implementation.
Figure 3C:
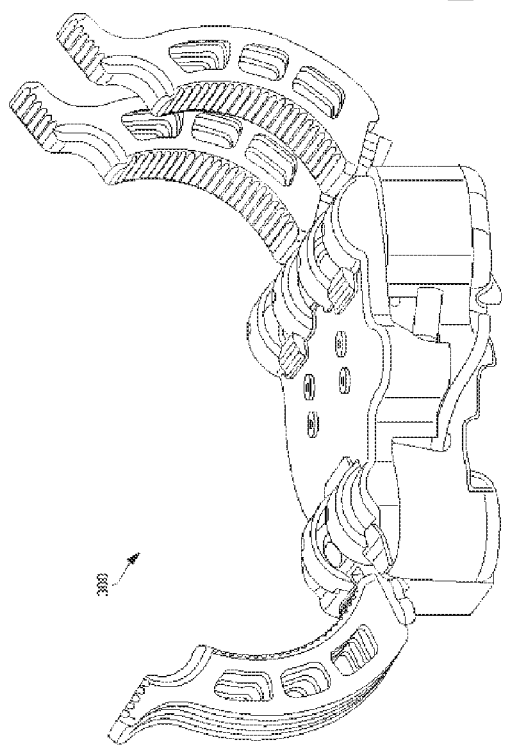
FIG. 3C illustrates example gripping members, according to an example implementation.

FIGS. 3C and 3D illustrate various gripping members that may be attached to gripper 300, according to example implementations. As discussed above, the gripper 300 may be configured such that various gripping members can be attached based on a particular use case. In particular, FIG. 3C illustrates an example gripper 300 including curved gripping members. Such gripping members may be used to grasp circular or cylindrical objects, for example. FIG. 3D illustrates an example gripper 300 including adaptive fingers that may be used to grasp oddly shaped objects, for example.

It should be noted that other grippers may include more or less components than those that are shown in FIGS. 2A, 2B, 2C, 2D, 2E, 3A, 3B, 3C, and 3D. For instance, in other implementations, the gripper may include more or less motors, gears, and/or axles. Additionally or alternatively, the number of linkages may vary depending on the kinematics and grip force that is required to have the gripper perform a particular task. For instance, in some arrangements, the linkages may be eliminated, and the gripping tips and/or other components may be coupled directly or almost directly to the axle(s). Overall, such additional or reduced components may drive operations of the gripper described herein or perhaps other operations of the gripper not described herein. By way of example, such components may serve to drive individual actuation of each separate finger independently from other fingers, including substantially linear actuation of an individual finger and/or rotational actuation of the individual finger. Other operations are possible as well.

It should also be noted that while the gripping fingers are shown to be substantially symmetrical and including the same elements, each gripping finger may include one or more elements different from the other gripping finger.

In operation, it may be advantageous for the control system to determine or receive various information associated with the object(s) at issue, such as the locations, dimensions, weights, centers of mass, etc. of the object(s), in order to help the control system determine how to actuate the robotic gripper and/or other aspects of the robotic device to perform certain tasks. Within examples, the control system may determine degrees and/or speeds of rotation of the gripping fingers based on how much force and torque the control system knows the gripping fingers can handle.

Further, with the freedom that the disclosed gripper provides, a control system can dynamically adjust movement of the gripper based on changing conditions in the environment, such as the weight of the object shifting while the object is being moved, obstacles present in the environment as the gripper is navigated through the environment from one location to another, among other possibilities. To facilitate this, force sensors, torque sensors, cameras, etc. of the robotic device may keep the control system informed of (i) what force/torque is exerted on the finger(s), (ii) where in the environment the gripper is located, (iii) what obstacles are present in the environment, etc.

Figure 4:
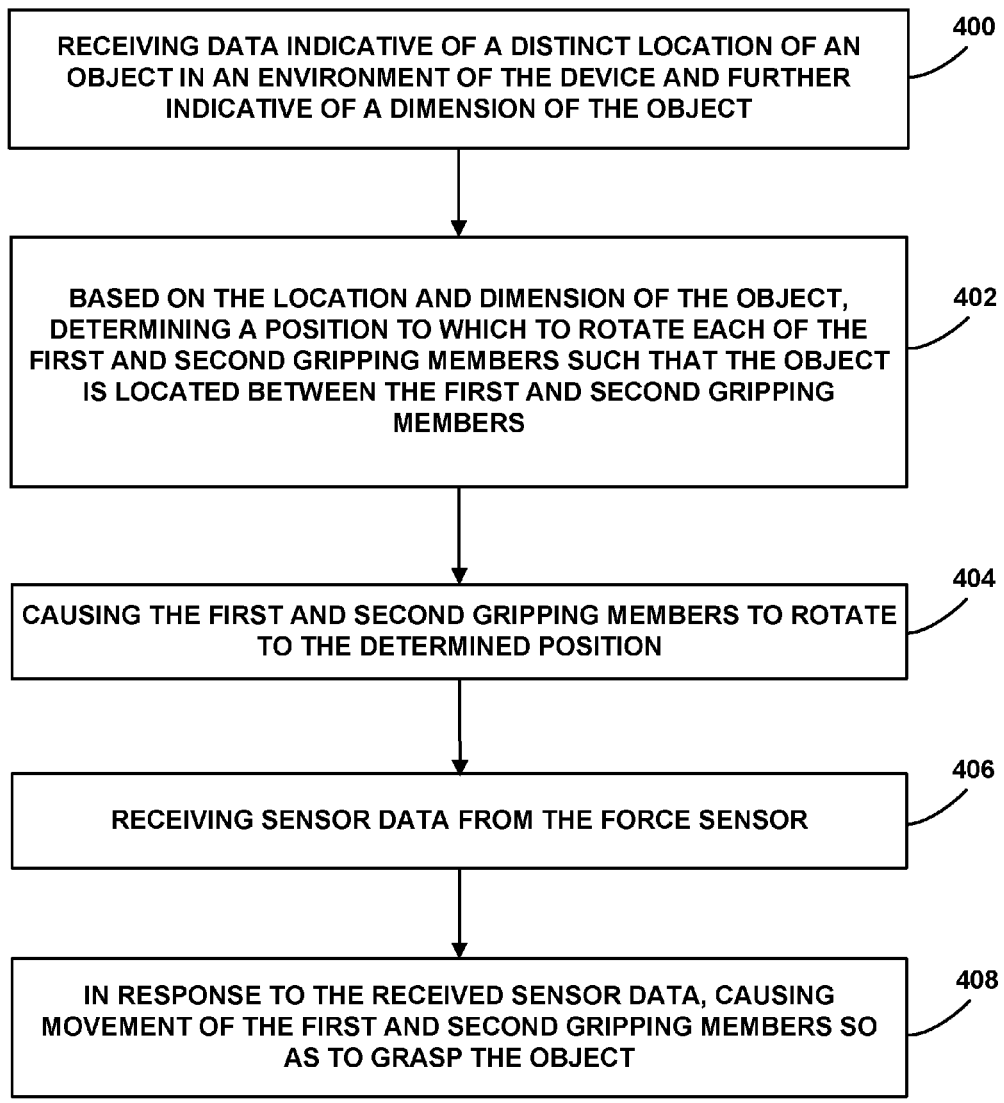
FIG. 4 is a flow chart of an example method, in accordance with at least some implementations described herein.

FIG. 4 is a flow chart of an example method for controlling a robotic gripper to pick up and grasp an object. The method shown in FIG. 4 presents an implementation of a method that, for example, could be used with the system shown in FIG. 1 and/or with the systems and apparatuses shown in FIGS. 2A, 2B, 2C, 2D, 2E, 3A, 3B, 3C, and/or 3D, for example, or may be performed by a combination of any components of in these figures. The method may include one or more operations, or actions as illustrated by one or more of blocks 400, 402, 404, 406, and 408. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method and other processes and methods disclosed herein, the flowchart shows operation of one possible implementation of present implementations. In this regard, each block may represent a module, a segment, or a portion of program code, which includes one or more instructions executable by one or more processors for implementing specific logical operations or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method and other processes and methods disclosed herein, each block in FIG. 4 may represent circuitry that is wired to perform the specific logical operations in the process.

Operations of this example method, and operations of other methods and processes disclosed herein, may be performed at least in part by a control system configured control a robotic device and/or other components or subsystems (e.g., sensors or another type of robotic vision system located remotely from the system) that are associated with the robotic device, such as control system 106 and/or other subsystems of robotic device 100 described above.

At block 400, the control system receives data indicative of a distinct location of an object in an environment of the device, and further indicative of a dimension of the object. Within examples, the data may be based at least in part on information obtained by a vision system of the robotic device and/or by a system configured to store and maintain a location of the object. Further, the data may include a 2D image or 3D model of the environment that indicates where in the environment the object is located. Still further, the data may include coordinates of the object. Yet still further, the data may include dimensions of the object and/or a weight of the object, as noted above.

At block 402, the control system determines, based on the location and dimension of the object, positions to which to rotate each of the first and second gripping members such that the object is located between the first and second gripping members.

In some implementations, the positions to which the control system moves each gripping member may be based on other considerations as well. By way of example, the positions may be based at least in part on other information included in the received data, such as the dimensions the object. Accordingly, the distance at which the control system separates the gripping members may be based on how much space is needed between the gripping members for the object, for instance. As another example, the positions to which the control system moves gripping members may be based at least in part on locations of other objects in the environment. To facilitate this, the control system may receive other data indicative of the surrounding environment of the gripper through which the gripper will need to navigate in order to approach and grasp the object without interfering with (e.g., contacting) certain other objects in the environment. In this manner, if the gripper is navigating a tight space to grasp the object, for instance, the control system may not separate the gripping members too far apart and/or may not rotate the gripping members to a degree where the gripper might contact other objects. Other examples are possible as well.

Within examples, the control system may receive the data before the gripper is near the object and may thus determine or estimate these positions as part of a process in which the control system plans in advance a task for the robotic device to complete. Within other examples, the data may be based at least in part on information obtained by sensors coupled to the gripper itself, and thus the control system may not determine or estimate these positions until the gripper is close enough to the object to properly obtain this information.

At block 404, the control system causes first and second gripping members to rotate to the determined positions. At block 406, the control system receives sensor data from the force sensor of the gripper. As discussed above, the sensor data may be indicative of the gripper contacting the object. As another example, the sensor data may be indicative of the gripper contacting a surface on which the object is resting. Other examples of sensor data are possible as well. And at block 408, in response to the received sensor data, the control system causes movement of the first and second gripping members toward each other so as to grasp the object. Once the object has been grasped, the force sensor may provide information indicative of various mass properties of the object, such as a weight of the object, and/or dimensions of the object.

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are operational entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A device comprising:
    a housing defining a cavity;
    a force sensor;
    a first hydraulic actuator positioned in the cavity and movable between a first relaxing mode and a first thrusting mode along a longitudinal axis of the first hydraulic actuator based at least in part in response to sensor data from the force sensor, the first hydraulic actuator comprising a first rod and a first roller coupled to a distal end of the first rod and configured to rotate relative to the first rod about a first axis of rotation, the first axis of rotation extending substantially perpendicular to the longitudinal axis of the first hydraulic actuator;
    a second hydraulic actuator positioned in the cavity and movable between a second relaxing mode and a second thrusting mode along a longitudinal axis of the second hydraulic actuator based at least in part in response to sensor data from the force sensor, the second hydraulic actuator comprising a second rod and a second roller coupled to a distal end of the second rod and configured to rotate relative to the second rod about a second axis of rotation, the second axis of rotation extending substantially perpendicular to the longitudinal axis of the second actuator, wherein the longitudinal axis of the first hydraulic actuator is substantially parallel to the longitudinal axis of the second hydraulic actuator;
    a first actuated member having a first cam surface in contact with the first roller to couple the first actuated member to the first hydraulic actuator, wherein the first actuated member is in a first open mode when the first hydraulic actuator is in the first relaxing mode, and wherein the first actuated member is in a first closed mode when the first hydraulic actuator is in the first thrusting mode;
    a second actuated member having a second cam surface in contact with the second roller to couple the second actuated member to the second hydraulic actuator, wherein the second actuated member is in a second open mode when the second hydraulic actuator is in the second relaxing mode, and wherein the second actuated member is in a second closed mode when the second hydraulic actuator is in the second thrusting mode;
    a first hydraulic channel in fluid communication with the first hydraulic actuator;
    a second hydraulic channel in fluid communication with the second hydraulic actuator; and
    a removable sealing component that configures the first hydraulic channel to be sealed off from the second hydraulic channel, wherein the first actuated member and the second actuated member are individually controllable.

2. The device of claim 1, wherein the removable sealing component selectively configures the first hydraulic channel to be in fluid communication with the second hydraulic channel so that a pressure applied to the first hydraulic actuator is equal to a pressure applied to the second hydraulic actuator.

3. The device of claim 1, wherein the first cam surface and the second cam surface include involute cam surfaces.

4. The device of claim 1, further comprising:
    a first biasing member that biases the first hydraulic actuator to the first relaxing mode; and
    a second biasing member that biases the second hydraulic actuator to the second relaxing mode.

5. The device of claim 1, further comprising:
    a first encoder coupled to the first actuated member to provide data indicative of motion of the first actuated member, wherein a controller causes the first actuated member to rotate based on the controller causing the first hydraulic actuator to move between the first relaxing mode and the first thrusting mode; and
    a second encoder coupled to the second actuated member to provide data indicative of motion of the second actuated member, wherein the controller causes the second actuated member to rotate based on the controller causing the second hydraulic actuator to move between the second relaxing mode and the second thrusting mode.

6. The device of claim 1, further comprising:
    a third hydraulic actuator positioned in the cavity, wherein the third hydraulic actuator moves between a third relaxing mode and a third thrusting mode along a longitudinal axis of the third hydraulic actuator, and wherein the longitudinal axis of the first hydraulic actuator and the longitudinal axis of the second hydraulic actuator are substantially parallel to the longitudinal axis of the third hydraulic actuator; and
    a third actuated member coupled to the third hydraulic actuator, wherein the third actuated member is in a third open mode when the third hydraulic actuator is in the third relaxing mode, and wherein the third actuated member is in a third closed mode when the third hydraulic actuator is in the third thrusting mode.

7. The device of claim 6, further comprising a hydraulic channel in fluid communication with each of the first hydraulic actuator, the second hydraulic actuator, and the third hydraulic actuator.

8. The device of claim 7, wherein the second hydraulic actuator is positioned between the first hydraulic actuator and the third hydraulic actuator in the cavity, and wherein a torque applied to the second actuated member is approximately double a torque applied to the first actuated member and approximately double a torque applied to the third actuated member.

9. The device of claim 7, further comprising one or more removable sealing components which configure a first hydraulic channel in fluid communication with the first hydraulic actuator to be sealed off from one or more of a second hydraulic channel in fluid communication with the second hydraulic actuator and a third hydraulic channel in fluid communication with the third hydraulic actuator, such that each of the first actuated member, the second actuated member, and the third actuated member are individually controllable.

10. The device of claim 6, further comprising:
a first hydraulic channel in fluid communication with the first hydraulic actuator;
a second hydraulic channel in fluid communication with the second hydraulic actuator; and
a third hydraulic channel in fluid communication with the third hydraulic actuator, such that each of the first actuated member, the second actuated member, and the third actuated member are individually controllable.

11. A robotic device comprising:
a first limb;
a second limb coupled to the first limb;
a gripping component coupled to the second limb, wherein the gripping component comprises:
a housing defining a cavity;
a force sensor;
a first hydraulic actuator positioned in the cavity and movable between a first relaxing mode and a first thrusting mode along a longitudinal axis of the first hydraulic actuator, the first hydraulic actuator comprising a first rod and a first roller coupled to a distal end of the first rod and configured to rotate relative to the first rod about a first axis of rotation, the first axis of rotation extending substantially perpendicular to the longitudinal axis of the first hydraulic actuator;
a second hydraulic actuator positioned in the cavity and movable between a second relaxing mode and a second thrusting mode along a longitudinal axis of the second hydraulic actuator, the second hydraulic actuator comprising a second rod and a second roller coupled to a distal end of the second rod and configured to rotate relative to the second rod about a second axis of rotation, the second axis of rotation extending substantially perpendicular to the longitudinal axis of the second actuator, wherein the longitudinal axis of the first hydraulic actuator is substantially parallel to the longitudinal axis of the second hydraulic actuator;
a third hydraulic actuator positioned in the cavity, wherein the third hydraulic actuator moves between a third relaxing mode and a third thrusting mode along a longitudinal axis of the third hydraulic actuator, and wherein the longitudinal axis of the first hydraulic actuator and the longitudinal axis of the second hydraulic actuator are substantially parallel to the longitudinal axis of the third hydraulic actuator;
a first gripping member having a first cam surface in contact with the first roller to couple the first gripping member to the first hydraulic actuator; and
a second gripping member having a second cam surface in contact with the second roller to couple the second gripping member to the second hydraulic actuator;
a third gripping member coupled to the third hydraulic actuator; and
a hydraulic channel in fluid communication with each of the first hydraulic actuator, the second hydraulic actuator, and the third hydraulic actuator, wherein the second hydraulic actuator is positioned between the first hydraulic actuator and the third hydraulic actuator in the cavity, and wherein a torque applied to the second gripping member is approximately double a torque applied to the first gripping member and approximately double a torque applied to the third gripping member; and
a controller comprising at least one processor and data storage comprising instructions executable by the at least one processor to cause the controller to perform operations comprising, based at least in part in response to sensor data from the force sensor, causing the first and second hydraulic actuators to move between the first and second relaxing modes and the first and second thrusting modes to thereby cause movements of the first and second gripping members toward each other so as to grasp one or more objects.

12. The robotic device of claim 11, wherein the operations further comprise:
receiving data indicative of an object in an environment of the robotic device, the data including a location of the object in the environment;
based on the location of the object, determining a position to which to rotate each of the first and second gripping members such that the object is located between the first and second gripping members;
causing the first and second gripping members to rotate to the determined position; and
causing movement of the first and second gripping members so as to grasp the object.

13. The robotic device of claim 11, wherein the gripping component further comprises:
a first biasing member that biases the first hydraulic actuator to the first relaxing mode; and
a second biasing member that biases the second hydraulic actuator to the second relaxing mode.

14. The robotic device of claim 11, wherein the gripping component further comprises:
a first encoder coupled to the first gripping member to provide data indicative of motion of the first gripping member, wherein a controller causes the first gripping member to rotate based on the controller causing the first hydraulic actuator to move between the first relaxing mode and the first thrusting mode; and
a second encoder coupled to the second gripping member to provide data indicative of motion of the second gripping member, wherein the controller causes the second gripping member to rotate based on the controller causing the second hydraulic actuator to move between the second relaxing mode and the second thrusting mode.

15. The robotic device of claim 11, further comprising:
a first hydraulic channel in fluid communication with the first hydraulic actuator;
a second hydraulic channel in fluid communication with the second hydraulic actuator; and
a third hydraulic channel in fluid communication with the third hydraulic actuator, such that each of the first gripping member, the second gripping member, and the third gripping member are individually controllable.

\* \* \* \* \*